United States Patent [19]
Nisper

[11] 3,851,889
[45] Dec. 3, 1974

[54] RECIPROCATING SYSTEM AND HYDRODYNAMIC PISTON RING THEREFOR
[75] Inventor: Kenneth J. Nisper, Spring Lake, Mich.
[73] Assignee: Questor Corporation, Toledo, Ohio
[22] Filed: Feb. 15, 1973
[21] Appl. No.: 332,601

[52] U.S. Cl. .............................. 277/214, 277/216
[51] Int. Cl. ............................................. F16j 9/00
[58] Field of Search .......... 277/216, 215, 139, 214, 277/201, 202, 173, 78

[56] References Cited
UNITED STATES PATENTS
1,614,602  1/1927  Day .................................. 277/214
1,636,027  7/1927  Walter ............................. 277/202
2,372,979  4/1945  Phillips ........................... 277/214

Primary Examiner—Samuel B. Rothberg
Attorney, Agent, or Firm—Harry O. Ernsberger

[57] ABSTRACT

The disclosure embraces a reciprocating system embodying a hydrodynamic piston ring and more especially to a hydrodynamic lubricant control ring for use in reciprocating piston instrumentalities such as pistons of internal combustion engines, the piston ring embodying a novel peripheral configuration providing hydrodynamic sealing characteristics promoting the maintenance of a minimum oil film and cavitation action during piston reciprocation effecting economies in lubricant consumption without impairing lubrication at the interfacial region of the ring with a cylinder wall.

7 Claims, 21 Drawing Figures

RECIPROCATING SYSTEM AND HYDRODYNAMIC PISTON RING THEREFOR

The invention relates to a reciprocating system such as a piston reciprocating within a cylinder of an internal combustion engine, the piston being equipped with a ring having a hydrodynamic peripheral configuration effective to promote pumping of the lubricating oil on the cylinder wall toward the engine crankcase, such action being usually referred to as "down-pumping," to thereby reduce oil consumption.

It has been conventional practice in the manufacture of internal combustion engines of the reciprocating piston type to equip each piston with one or more compression rings and an oil ring. A conventional compression ring is machined on its outside diameter with a precise thread finish to provide either a substantial cylindrical peripheral surface or a barrel-shaped surface, the machined surfaces being comparatively rough. During an initial period of engine operation, the machined surface of the ring functions hydrodynamically at an optimum level providing a micro-hydrodynamic sealing action or function. The ring is fitted in a groove in the piston and necessarily has sufficient clearance to permit slight vertical movement of the ring during reciprocations of the piston. During continued engine operation, by reason of the vertical clearance for the ring in the ring groove, the outside diameter or peripheral face of the ring progressively wears into a very smooth barrel-face contour and the micro-hydrodynamic sealing is lost or greatly diminished, the resulting sealing action of the smooth barrel-face contour of reduced efficiency being referred to as a macro-hydrodynamic action.

By reason of the formation by engine operation of the smooth barrel-face contour on the ring, a condition of equilibrium is approached and the oil consumption becomes stabilized but at a low level. This condition obtains with substantially all known production compression ring constructions.

The present invention has for an object the provision of a piston ring for use with a piston in a reciprocating system, such as an internal combustion engine, wherein the ring is fashioned with a peripheral region especially configured to foster effective hydrodynamic sealing characteristics with the cylinder wall by promoting flow of oil on the cylinder wall predominately in one direction and thereby minimize oil consumption of the reciprocating system.

Another object of the invention resides in a piston ring construction particularly for use in a reciprocating system, such as an internal combustion engine, wherein a peripheral region of a compression ring is especially configured to promote the establishment of differential pressures above and below the peripheral region of the ring effective to foster the flow of lubricant in one direction toward the crank-case by reason of the hydrodynamic sealing characteristics effected through the differential pressures to promote economic consumption of lubricant.

Another object of the invention is the provision of a piston ring wherein the peripheral region of the ring is configured or contoured to effectively prolong the micro-hydrodynamic sealing action or function of the ring.

An object of the invention is the provision of a reciprocating system involving an oil control ring in a reciprocating piston configured to establish during reciprocation differential pressures at the upper and lower peripheral regions of the ring to promote cavitation in the system of a character wherein the flow of oil or lubricant in the system is predominately in one direction of movement of the piston.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the hydrodynamic ring construction of the invention has particular use with piston constructions of reciprocating piston type internal combustion engines, it is to be understood that the ring construction of the invention may be utilized with pistons of reciprocating piston pumps, compressors or other reciprocating systems.

The terms "up-pumping" and "down-pumping" are hereinafter used to describe the direction of flow of oil in a reciprocating system, "up-pumping" designating direction of flow of oil along a cylinder wall away from the crankcase of a reciprocating system, and "down-pumping" designating direction of flow of oil toward the crankcase.

Figures 1, 2, 3:
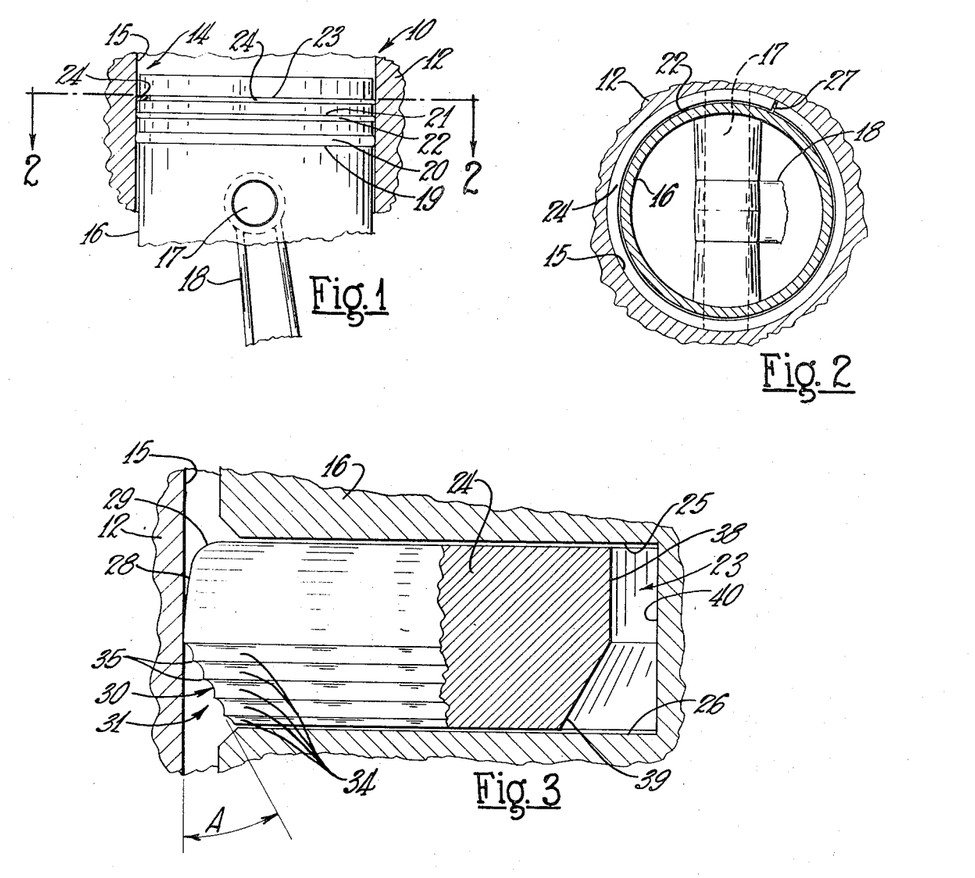
FIG. 1 is a fragmentary view of a reciprocating system such as a reciprocating-piston internal combustion engine including a cylinder and piston and embodying a form of hydrodynamic compression ring of the invention.
FIG. 2 is a sectional view taken substantially on the line 2—2 of FIG. 1.
FIG. 3 is a greatly enlarged fragmentary sectional view illustrating the assembly of one form of compression ring of the invention in a groove of a reciprocating piston.

Referring initially to FIGS. 1 through 3, there is illustrated a reciprocating system comprising a reciprocating piston type of internal combustion engine 10 which is inclusive of a cylinder block 12 having a bore 14 providing a cylinder wall 15, the bore accommodating a reciprocating piston 16. The piston is connected by a wrist pin 17 with a connecting rod 18, the latter being connected in the conventional manner with a crankshaft (not shown) in the crankcase of the engine. The engine may be of the multicylinder type.

As shown in FIG. 1, the piston 16 is provided with a comparatively wide groove 19 accommodating a one-piece parted oil ring 20, an intermediate groove 21 accommodating a conventional one-piece parted compression ring 22, and an upper groove 23 accommodating a one-piece parted hydrodynamic compression ring 24 of the invention. The ends of each of the rings are in abutting or adjacent relation, the ends of the hydrodynamic compression ring 24 being in adjacent or abutting relation as indicated at 27 in FIG. 2.

In conventional construction of compression piston rings, the peripheral sealing face of the ring is machined with a cylindrical surface or a barrel-shaped surface and such machined surfaces are comparatively rough. This initial roughness provides a desirable micro-hydrodynamic sealing action promoting high oil economy.

Continuing operation of the engine and hence reciprocation of the piston or pistons result in a machined barrel-shaped ring face becoming very smooth, and with a ring having a machined cylindrical face, continued use results in a wearing of the peripheral surface of the ring into a very smooth, substantially barrel-shaped configuration or contour as the upper and lower worn regions of the ring face are slightly inclined with respect to the cylinder wall surface. In the use of a ring with a smooth worn surface, large forces are developed in the small inclined clearance spaces and during reciprocatory motions of the piston with respect to the cylinder, the oil or lubricating fluid is "wedged" into the decreasing spaces when the ring moves in the direction of decreasing oil film thickness at the periphery of the ring.

In the opposite inclined space in which the same direction of movement of the piston tends to increase oil film thickness, the pressure may be below the vapor pressure or cavitation pressure of the oil or fluid which would result in some cavitation. Where the peripheral surface of a piston ring has become worn to a very smooth barrel shape configuration, movement of the piston in one direction forms a hydrodynamic fluid or oil wedge at one region of the ring and a tendency for cavitation exists at the opposite peripheral region of the ring.

During reciprocating movements of the piston, these actions are alternately reversed with each change in direction of the movement of the piston. A differential in cavitation action between the peripheral upper and lower regions of a ring will modify the pressure profiles adjacent the upper and lower peripheral regions of a ring and thereby modify the fluid or oil flow rates in opposed directions of movement of the piston.

It has been found that by imparting a special relief or cutaway configuration to a lower peripheral portion of a compression ring, turbulence and cavitation may be increased during movement of the piston in one direction providing a down-pumping action of the ring in the given direction and greatly prolonging and maintaining the micro-hydrodynamic sealing characteristics of the ring.

When the piston is moving away from the crankcase toward the combustion or compression chamber region of the cylinder, an up-pumping action is undesirable as the flow of oil would be predominately toward the combustion or compression chamber and thus result in the use of an excessive amount of oil for lubrication. It is therefore desirable to promote a down-pumping action, that is, a pumping action to establish direction of oil flow predominately away from the compression or combustion chamber toward the crankcase to reduce oil consumption.

FIG. 3 is a greatly enlarged sectional view illustrating one form of hydrodynamic piston ring 24 of the invention. In this form approximately the upper half of the peripheral face region of the ring is fashioned with a slight inclination or barrel-shaped configuration or curvature 28 and the upper peripheral edge provided with a small radius as indicated at 29. The inclination, curved or barrel-shaped configuration 28 is in the portion of the ring adjacent the combustion or compression chamber.

Approximately the lower half portion of the peripheral region or ring face of the ring is especially configurated as shown at 30, the configuration being of a character to produce differential pressures adjacent the upper and lower peripheral surface regions to promote a down pumping action toward the engine crankcase. The peripheral lower region of the ring is cut away, relieved or shaped as indicated at angle A whereby the peripheral surface of the ring at the region 30 in the form shown in FIG. 3 is generally of frusto-conically shaped configuration. This configuration associated with the cylinder wall forms an annular space or chamber 31 of generally triangular or wedge-shaped cross section.

In addition to providing a peripheral or circumferential spacial region 31 promoting cavitation, it is desirable in securing a down-pumping action, to provide the generally frusto-conically shaped surface region of the ring with a configuration to establish turbulence at the peripheral region 30 as turbulence tends to produce cavitation. In the arrangement shown in FIG. 3 a plurality of circumferentially arranged recesses 34 is provided in the generally frusto-conically shaped surface region 30, the spaced circular ridges or projections 35 provided by the recesses and the recesses setting up turbulence in the peripheral region 31 defined by the Angle A.

By establishing turbulence in the region 31, cavitation is increased. The fluid pressure in region 31 during upward movement of the piston is low and may be below the vapor pressure point of the oil or fluid. Thus, the pressure on the bottom half of the ring is lower than the pressure on the top half and hence oil flow is predominately downward. The turbulence and cavitation established adjacent the peripheral lower half of the ring is effective to disrupt the fluid or oil flow past the exterior of the ring face and also prevents laminar-like flow past the side of the ring, the prevention of laminar-like flow further tending to reduce up-pumping by the ring.

The angle or taper A, generated about the axis of the piston ring, provides a frusto-conically shaped configuration, the amount of angularity or taper being indicated by the angle A. It is found that for most piston ring sizes that the amount of taper or angularity of the frusto-conically shaped configuration 30, viz. angle A, should be approximately 20° with respect to the axis of the ring or an included angle of 40° for the frusto-conically shaped configuration. The amount of taper or angularity A may be within a range of about 10° and 30°, the angularity being depending in a measure upon the extent of turbulence and cavitation desired in order to secure effective down-pumping action.

This configuration is found to establish differential pressures above and below the mid region at the periphery of the ring to effect a down-pumping action during certain reciprocatory movements of the piston and ring. The frusto-conically shaped surface region 30 may be fashioned without projections and recesses as a smooth uninterrupted surface, and such uninterrupted surface may produce cavitation, but it is found that through the use of projections and recesses, turbulence is set up which substantially increases the cavitation effect.

The annular groove or recess 22 accommodating the piston ring 24 has an upper wall or surface 25 and a lower wall or surface 26. The groove 22 is of greater width than the thickness of the piston ring in order to accommodate free movement of the ring and assure conformance of the periphery of the ring with the cylinder wall 15. The inner cylindrical surface 38 and the inner frusto-conically shaped surface 39 of the ring are spaced substantially from the inner cylindrical wall 40 of the annular groove 22 accommodating the piston ring 24.

FIGS. 5 through 8 illustrate the several relative positions and functioning of a conventional compression piston ring of the prior art during the four strokes or cycles of intake, compression, combustion and exhaust of a four cycle engine. FIGS. 9 through 12 illustrate the corresponding relative positions and functioning of the hydrodynamic compression ring 24 of the invention.

Figure 5:
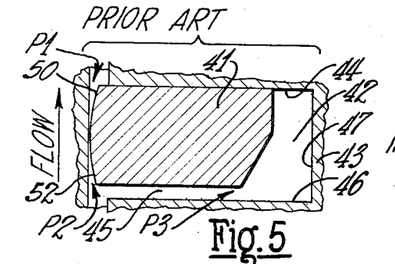
FIG. 5 is a fragmentary enlarged sectional view illustrating the relative position of a conventional piston ring of the prior art in the groove in a reciprocating piston during the mixture intake stroke of the piston.

Referring to FIG. 5, the conventional piston ring 41 is disposed in a groove or recess 42 in a piston 43, the groove being defined by an upper surface 44, a lower surface 46 and an inner or bottom surface 47. The ring 41 illustrated in cross section in FIGS. 5 through 8 has a peripheral barrel-like sealing surface or face. Where the conventional ring is initially fashioned with a cylindrical sealing face, the sealing surface of the ring soon wears to a barrel-like configuration as shown in FIGS. 5 through 8.

The barrel drop or depth of the surface 50 of the upper portion of the ring face is greater than the drop or depth of the barrel-shaped configuration 52 at the lower portion of the ring face. On the intake stroke, the piston is moving down or away from the compression or combustion chamber and the upper surface of the ring is engaged by the surface 44 of the slot in the piston. The inclined surface formed by the barrel face portion 52 is of lesser inclination than the inclination of the barrel face portion 50 at the upper portion of the ring.

Hence the pressure P2 at the peripheral region adjacent the barrel face portion 52 is greater than the pressure P1 adjacent the barrel face portion 50 because of the pressure build-up on the bottom side of the ring during the intake stroke and the reduced or subatmospheric pressure at the top side of the ring. The pressure P3 in the space 45 below the ring and the adjacent space at the inner region of the groove 42 of the piston ring 41 is less than the pressure P2. Hence there is a tendency for laminar-like flow of oil or fluid between the bottom side of the ring into and through the groove 42 and the top side of the ring and upward into the combustion or compression chamber.

Figure 9:
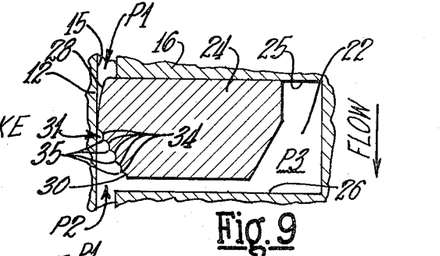
FIG. 9 is an enlarged fragmentary sectional view illustrating the hydrodynamic ring of FIG. 3 in its relative position in the groove in the piston during the intake stroke of the piston.

FIG. 9 illustrates the relative position and functioning of the hydrodynamic piston ring 24 of the invention during the intake stroke of an engine or reciprocating system. The space or region 31 defined by the generally frusto-conical configuration of the lower peripheral portion of the ring is of substantial volume so that the pressure build-up is comparatively low or substantially nonexistent while there is a pressure reversal on the top side of the ring adjacent the surface 28.

The configuration provided by the recesses 34 and ridges 35, shown in FIG. 3, establishes turbulence and cavitation so that the fluid pressure P1 at the configuration 28 is greater than the pressure P2 at the region 31. The pressure P3 in the region of the groove 22 below the piston ring 24 and in the region 23 is greater than or at least equal to the pressure P2 at the region 31 and this condition tends to prevent laminar oil or fluid flow past the side of the ring 24. This also tends to reduce up-pumping by the ring. Hence, on the intake stroke of the hydrodynamic ring 24, oil flow is predominately in the direction of downward movement of the piston toward the crankcase.

Figure 6:
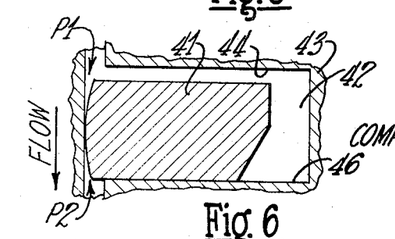
FIG. 6 is a fragmentary enlarged sectional view similar to FIG. 5 illustrating the relative position of the conventional piston ring of the prior art in the groove during the compression stroke of the piston.

FIG. 6 is illustrative of the relative position of the prior art or conventional piston ring 41 during the compression stroke of the piston. The pressure P1 is greater than the pressure P2 and hence oil or fluid flow is downward. During the compression stroke there is laminar oil or fluid flow downward past the peripheral face of the ring 41 and around the side of the ring through the recess 42 as the lower side surface of the ring is in engagement with the lower surface 46 of the annular groove or recess 42 in the piston.

Figure 10:
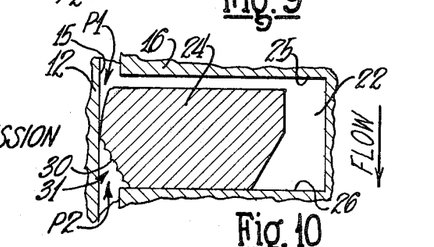
FIG. 10 is an enlarged fragmentary sectional view similar to FIG. 9 illustrating the relative position of the hydrodynamic piston ring of FIG. 3 in the groove in the piston during the compression stroke of the piston.

FIG. 10 illustrates the relative position of the hydrodynamic piston ring 24 in the slot 22 during the upward compression stroke of the piston, the lower side of the ring engaging the surface 26 of the groove 22. The outside diameter at the mid region of the piston ring is adjacent to or in contact with the cylinder wall 15. Thus, during the compression stroke there is laminar flow of oil downward past the face of the ring and in the groove 22 around the inner surface of the ring.

By reason of the annular region 31 of generally wedge-shaped cross section at the lower or down side of the ring, the pressure P1 is greater than the pressure P2, a condition enhancing cavitation during upward movement of the piston on the compression stroke. This condition at the region 31 promotes downward flow of oil during upward movement of the piston 16. While there is a tendency for oil flow downward of the piston ring 41 of prior art construction illustrated in FIG. 6, the configuration of the hydrodynamic ring 24 at the region 31 effects increased flow of oil in a downward direction.

Figure 7:
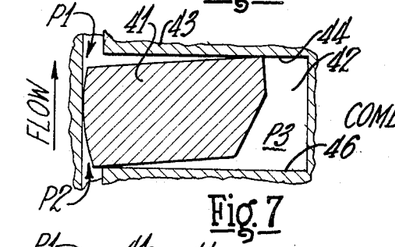
FIG. 7 is a fragmentary enlarged sectional view similar to FIG. 5 illustrating the relative position of the conventional piston ring of the prior art during the compression stroke of the piston.

The relative position of the ring 41, illustrative of the prior art, on the combustion or downward stroke of the piston 43 is shown in FIG. 7. During this movement of the piston 43 and the ring 41, the pressure P2 is less than the pressure P1, and the pressure P2 is less than the pressure P3. On the combustion or downward stroke of the piston, with the pressure P1 being less than the pressure P2, the flow of oil is upward.

This action of oil flow upward during the combustion stroke of the piston results in the consumption of additional oil flowing to or toward the combustion chamber and away from the engine crankcase. Oil also tends to flow upwardly through the groove 42 and at the inner surface of the piston ring so that oil flows around the piston ring through the groove 42 to a region in the cylinder above the piston ring. Thus, in the conventional or prior art ring 41, additional oil flows upward through the groove 42, a condition which increases oil consumption on the combustion stroke.

Figure 11:
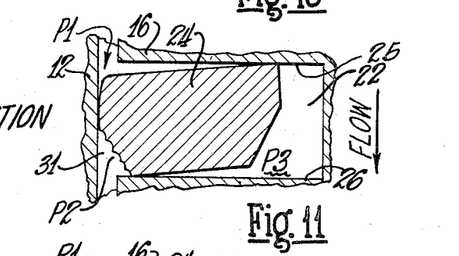
FIG. 11 is an enlarged fragmentary sectional view similar to FIG. 9 illustrating the relative position of the hydrodynamic piston ring of FIG. 3 in the groove in the piston during the combustion stroke of the piston.

FIG. 11 illustrates the relative position of the hydrodynamic ring construction 24 of FIG. 3 during the combustion stroke of the piston. The pressure P1 is greater than the pressure P2 and pressure P2 in the annular wedge-shaped region 31 is less than the pressure P3 in the groove 22. Hence there is a tendency for downward flow of fluid or oil during the downward movement of the piston ring 24 on the combustion stroke of the piston. It is possible that the fluid or oil flow may be substantially neutral but, in any event, there is no upward flow of oil as with the conventional or prior art piston ring 41 shown in FIG. 7.

The high pressure developed by combustion of a fuel and air mixture in the chamber above the piston are believed to promote a down-puming action at least during the upper half of the downward stroke of the piston ring. During the remaining portion of the downward stroke of the piston following combustion, the viscous effects of the oil would foster a down flow during such movement of the piston ring. In any event, the oil flow would be neutral or downward with the hydrodynamic piston ring 24 during the combustion stroke.

Figure 8:
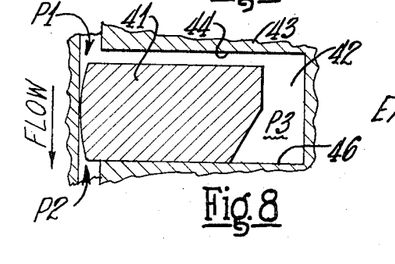
FIG. 8 is a fragmentary enlarged sectional view similar to FIG. 6 illustrating the relative position of the conventional piston ring of the prior art during the exhaust stroke of the piston.

During upward exhaust stroke of the conventional or prior art ring 41, the relative position of which is illustrated in FIG. 8, the oil or fluid would tend to flow downwardly during the exhaust stroke as on the compression stroke of the piston. During the exhaust stroke of the piston ring 41, the pressure P1 is greater than the pressure P2, and the pressure P3 in the groove 42 is greater than the pressure P2.

As no appreciable compression pressure exists during the upward or exhaust stroke of the piston, there would be some down pumping of oil during the upward exhaust stroke of the piston with the conventional prior art ring 41.

Figure 12:
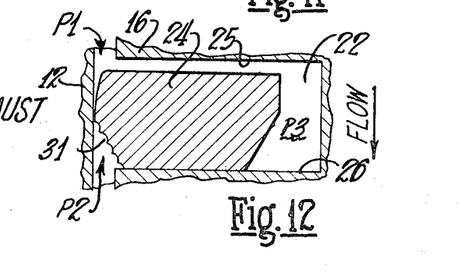
FIG. 12 is an enlarged fragmentary sectional view similar to FIG. 10 illustrating the relative position of the hydrodynamic piston ring of FIG. 3 in the groove in the piston during the exhaust stroke of the piston.

FIG. 12 illustrates the relative position of the hydrodynamic piston ring 24 of FIG. 3 in the groove 22 during the upward exhaust stroke of the piston 16. The pressure P1 is greater than the pressure P2 in the region 31 and the pressure P3 in the groove 22 at the inner and upper spaces adjacent the piston is greater than the pressure P2. The viscous characteristic of the oil would be predominate and hence there would be substantial down pumping action during the exhaust stroke of the hydrodynamic ring 24 which would be more effective than the down pumping action of the barrel-shaped face or peripheral surface of the conventional ring 41.

The foregoing comparison of the hydrodynamic piston ring 24 with the prior art or conventional piston ring 41 illustrates that the hydrodynamic ring 24 has a greater net down pumping action. In general, the effect of the cutaway region 31 defined by the frusto-conical configuration 30 at the lower portion of the peripheral surface of the ring 24 is to positively assure cavitation at said region at certain periods of reciprocation of the piston.

The conventional or prior art ring 43 of barrel face configuration may or may not produce appreciable cavitation during the life of the ring. In the hydrodynamic ring of applicant's invention, the relieved region or annular space 31 of wedge-shaped cross section and the recesses 34 and ridges or projections 35, shown in FIG. 3, provides for positive turbulence and cavitation during certain periods of reciprocating movements of the ring 24.

Turbulence and cavitation at the region 31 are effective in reducing the oil consumption of a reciprocating system embodying the hydrodynamic compression ring. The condition of cavitation is important since with a lubricant film the pressure in the cavitated region will be substantially constant and near to atmosphere or ambient pressure and influences oil or fluid flow and the direction of flow. In a piston ring complement system, very small variations in oil film thickness and oil flow have a substantial effect on oil economy.

Cavitation and turbulence set up or established in the region 31 adjacent the ring during engine operation performs two important functions: (1) tends to disrupt the flow of oil or fluid past the outside diameter or sealing face of the ring, and (2) substantially reduces or prevents laminar flow of oil or fluid past the side of the ring. This action of turbulence and cavitation reduces the up-pumping of oil during certain phases of reciprocation of the ring.

The peripheral or exterior surface of a conventional compression ring 41 of the prior art, in operation, soon wears to a barrel face configuration and such ring may or may not produce some degree of cavitation during the life of the ring. With the ring construction of the present invention having the relieved lower or annular frusto-conically shaped peripheral exterior region, an optimum micro-hydrodynamic action is positively assured and maintained for a much longer period of engine operation.

As the outside diameter of the ring 24 wears, the relief, undercut or spacial region 31 at the lower peripheral exterior region of the ring is maintained for a long period assuring a micro-hydrodynamic action. In event that the outside diameter of the ring 24 is subjected to excessive wear to an extent of partially modifying the generally frusto-conically shaped peripheral surface at the lower portion of the ring, the functioning of such excessively-worn compression ring would approach the functioning of a worn conventional or prior art piston ring construction.

By establishing either neutral flow or down flow or down pumping action of the hydrodynamic ring 24 during each of the positions of the piston viz. during the intake, compression, combustion and exhaust, oil consumption is substantially reduced.

Figure 4:
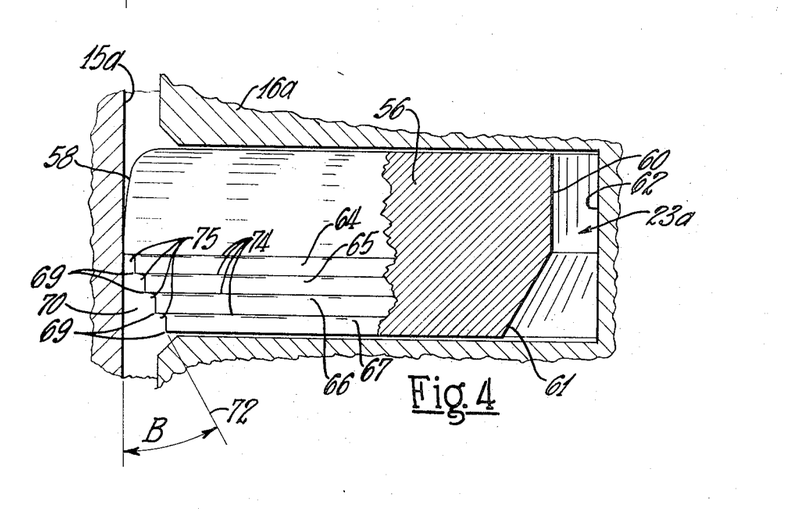
FIG. 4 is a greatly enlarged fragmentary sectional view illustrating another form of configuration of compression ring of the invention in a groove of a reciprocating piston.

FIG. 4 is a greatly enlarged view illustrating a modification of the form of hydrodynamic ring construction illustrated in FIG. 3 for providing micro-hydrodynamic sealing. In this form the hydrodynamic ring 56 is disposed in a groove 22a in a piston 16a, the width of the groove 22a being of a dimension to loosely accommodate the ring 56. The ring 56 is fashioned with an exterior upper portion slightly barrel-shaped or curved surface 58, the maximum outside diameter of the surface 58 engaging the cylinder wall 15a in the manner of engagement of the surface 28 of the ring 24 with the cylinder wall.

The inner circular contour of the ring is defined by a cylindrical surface 60 at the upper region of the ring and by a downwardly and outwardly flaring frusto-conically shaped surface 61. The surfaces 60 and 61 are spaced from the bottom 62 of the groove 22 to facilitate flow of oil or fluid around the sides of the ring. Approximately the lower half portion of the peripheral region or face of the ring 56 is fashioned with a plurality of circumferential areas of successively reduced diameters in echelon relation downwardly of the ring face.

In the embodiment illustrated in FIG. 4, there are four such circumferential regions or surfaces designated respectively 64, 65, 66 and 67. The circumferential surfaces are of diameters whereby the lower circular edge 69 of each diameter terminates approximately in a downwardly and inwardly projecting line 72 which, rotated about the vertical axis of the ring or piston, defines a generally frusto-concially shaped configuration of an angularity of taper indicated at B. The angle of taper indicated at B is preferably approximately 20°, but may be in a range of 10° to 30°.

Horizontal annular ledges 74 are formed between the adjacent circumferential surfaces 64, 65, 66 and 67 and the ledges and circumferential surfaces provide recesses 75 arranged in circumferential echelon relation defining projections or ridges 69 to effect turbulence in the annular region 70 of generally triangular cross section and promote cavitation during certain cycles of reciprocatory movement of the piston and thereby effect down flow or down-pumping action of oil or fluid along the cylinder wall 15a. The ring construction 56 shown in FIG. 4 functions in substantially the same manner as the ring 24 as explained in connection with the illustrations of FIGS. 9 through 12.

Figures 13, 14, 15, 16, 17, 18:
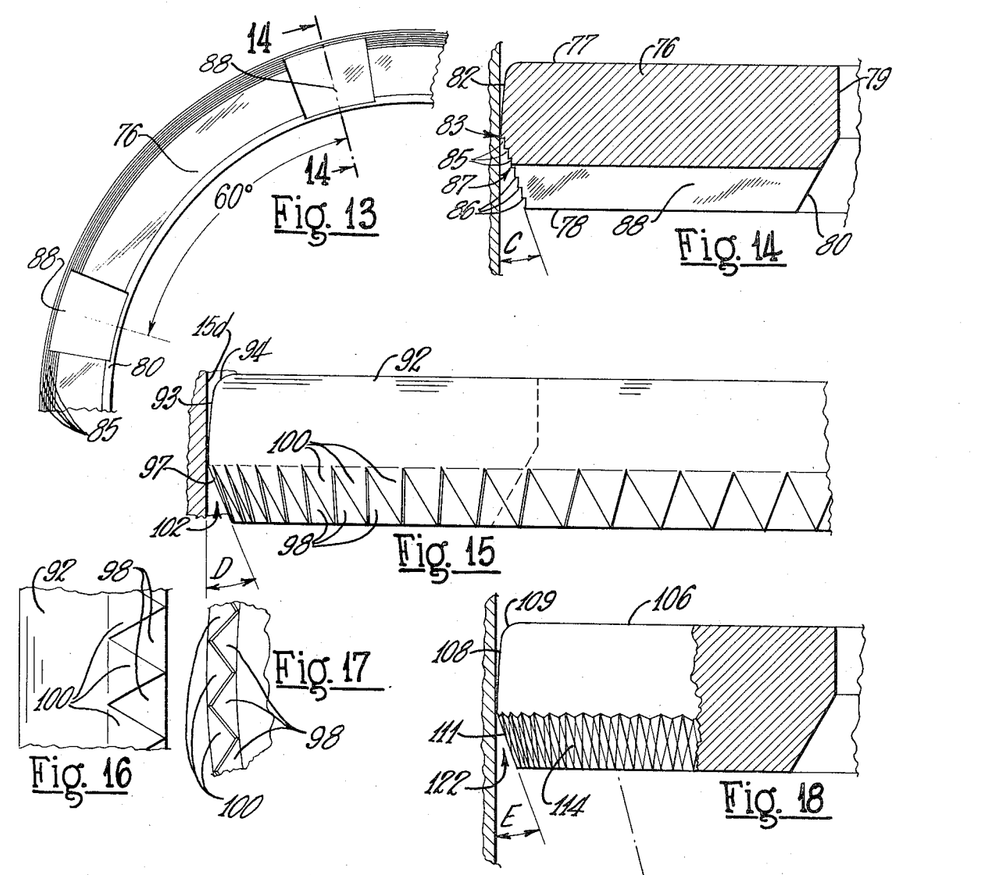
FIG. 13 is a fragmentary bottom plan view of a form of hydrodynamic oil ring of the invention embodying radially arranged oil flow passages.
FIG. 14 is an enlarged sectional view of the form of hydrodynamic oil ring shown in FIG. 13 illustrating one of the oil flow channels in the ring, the view being taken substantially on the line 14—14 of FIG. 13.
FIG. 15 is an enlarged elevational view of a hydrodynamic piston ring illustrating a modified configuration.
FIG. 16 is an elevational view of a central region of the ring shown in FIG. 15.
FIG. 17 is a fragmentary bottom plan view illustrating a portion of the ring shown in FIG. 15.
FIG. 18 is an elevational view, partly in section, of a hydrodynamic ring of the invention illustrating a modified configuration.

FIGS. 13 and 14 are greatly enlarged views illustrating a form of oil ring embodying the invention. In this form the hydrodynamic piston ring 76, preferably of cast iron for use in an oil ring groove in a piston, is fashioned with an upper side surface 77, a lower side surface 78, and inner surfaces 79 and 80, the surface 80 being of downwardly and outwardly flaring frusto-conical shape. The upper exterior peripheral surface region 82 of the ring 76 is slightly inclined or of barrel-shaped contour with the maximum diameter at the mid region 83 of the ring.

The lower exterior peripheral region of the ring is fashioned with a plurality of circumferential areas 85, each being of a successively lesser diameter from the mid region 83 to the lower surface 78 of the ring providing a circular echelon configuration. As illustrated in FIG. 14, circumferential areas 85 and the ledges 86 defined by the peripheral areas of varying diameters provide a plurality of recesses and projections for the purpose of establishing or promoting turbulence.

The ridges or projections terminate in a generally frusto-conically shaped pattern, the angularity or taper of which is indicated by the angle C with respect to the axis of the piston ring or piston with which the ring is used. While the diameters of the successive areas 85 may be varied and the vertical dimension of each area may also be varied, it is desirable that the angle of taper C of the frusto-conically shaped pattern or configuration be between 10° and 30° with respect to the axis of the ring. For most satisfactory operation in promoting turbulence and cavitation, angle or taper C should be about 20° or less.

In this form of hydrodynamic oil ring, radial slots 88 are disposed in the lower portion of the ring in circumferentially spaced relation. In the embodiment illustrated, six radial slots 88 are fashioned in the ring spaced 60° apart. The slots 88 provide passages to accommodate flow or drainage of oil or fluid back to the engine crankcase as is conventional with an oil ring.

The operation of the ring 76 in a reciprocating piston is generally similar to the operation of the forms of ring shown in FIGS. 3 and 4 and described in connection with FIGS. 9 through 12. The peripheral areas 85 of successively reduced diameters downwardly of the ring provide with the annular ledges 86 a plurality of circular recesses and projections effective to establish or promote turbulence and cavitation during periods of reciprocation of the ring in a cylinder.

FIGS. 15 through 17 are greatly enlarged views illustrating a modified form of hydrodynamic compression ring of the invention. In this form an upper portion or region of the peripheral face of the piston ring 92, preferably more than half of the ring thickness, is fashioned with a slight inclination or barrel-shaped configuration 93, the upper terminus preferably having a small radius as indicated at 94. The slightly inclined or barrel-shaped configuration 93 is in the portion of the ring nearest the combustion or compression chamber.

The lower peripheral face portion 97 of the ring 92, as shown in FIG. 15, is of generally frusto-conical shape, the taper or angularity of the frusto-conical shape being indicated by the angle D. The area or region of the frusto-conical shaped zone is configurated with shallow triangularly shaped recesses 98 which provide alternately disposed lands 100, the lands and recesses being reciprocally shaped triangles, the lands 100 being regions of the frusto-conically shaped surface 97.

The frusto-conically shaped surface region 97 forms with the cylinder wall 15d an annular space or chamber 102 or generally triangular or wedge-shaped cross section indicated by the angle or taper D. The lands 100 provide projections and the projections and recesses providing a configuration for establishing turbulence in the annularly-shaped zone 102 assisting in a cavitation action, and reducing laminar-like flow. These factors promote a down-pumping action of the fluid or oil on the cylinder wall.

The action or functioning of the piston ring 92 is similar to that of the piston ring illustrated in FIG. 3 and hereinbefore described with reference to FIGS. 9 through 12 during movements of a piston equipped with the ring 92. The pressure in the annular region 102 during upward movement of the piston toward the combustion chamber is low, and hence oil flow is predominately downward toward the engine crank-case. The configuration comprising the recesses 98 and lands 100 tends to disrupt the fluid or oil flow past the ring face and to reduce or prevent laminar-like flow past the side and inner faces or surfaces of the ring.

Figure 19:
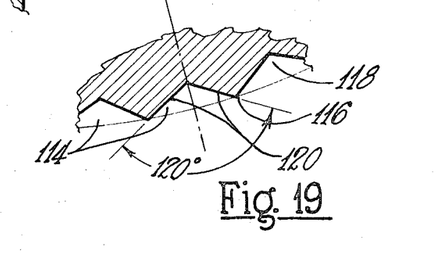
FIG. 19 is a greatly enlarged fragmentary sectional view of a portion of the ring construction illustrated in FIG. 18.

FIGS. 18 and 19 are greatly enlarged views illustrating a modified form of hydrodynamic compression ring 106 having a surface configuration or contour of a lower portion of the ring for establishing turbulence and cavitation to attain a down-pumping action of fluid or oil on a cylinder wall. The ring 106 is fashioned with a peripheral face wherein an upper portion 108 of the face of the ring is of slight inclination or barrel-shaped curvature with respect to the axis of the ring, and the upper edge preferably provided with a small radius 109 as in the other forms of piston ring hereinbefore described.

A lower exterior surface portion of the ring is of generally frusto-conically configuration or shape as indicated at 111. The degree of angularity or taper of the portion 111 is indicated by the angle E which is preferably about 20° with respect to the axis of the ring or the cylinder bore. However, the angularity or taper E may be in a range of 10° to 30° with respect to the axis of the ring or cylinder bore.

The frusto-conically shaped region 111 is provided with a knurled configuration 114 to establish, throughout the region 111, alternate ridges or projections 116 and recesses or flutes 118, the ridges and recesses being preferably in crossing relation as illustrated in FIG. 18, to provide a nonsmooth area or zone for the portion 111 for establishing turbulence and cavitation during certain movements of the piston ring in the cylinder setting up a down-pumping action of the fluid or oil on the cylinder wall. While the included angle of the surfaces 120 defining the ridges 116 and flutes 118 is preferably of approximately 120°, it is to be understood that ridges and flutes of different angularity may be employed if desired.

The frusto-conically shaped configuration 111 provides, with the wall of cylinder 15e, an annular zone or region 122 of wedge-shaped cross section. As shown in FIG. 18, the frusto-conically shaped portion 111 comprises less than one-half of the peripheral facial area of the ring, but it is to be understood that the portion 111 may comprise a greater or lesser area within the scope of the invention.

Figure 20:
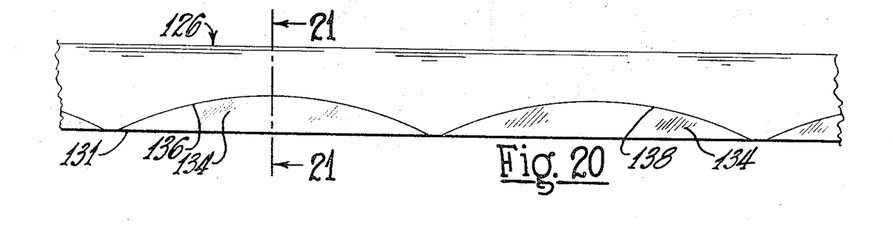
FIG. 20 is an enlarged fragmentary elevational view of a portion of a hydrodynamic ring illustrating another modification.
Figure 21:
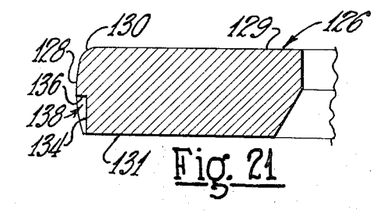
FIG. 21 is a sectional view taken substantially on the line 21—21 of FIG. 20.

FIGS. 20 and 21 are greatly enlarged views illustrating another form of hydrodynamic compression ring 126. In this form the ring 126 is fashioned with a peripheral barrel-shaped configuration 128, the upper region of which is joined with the upper surface 129 of the ring by a small radius 130, the ring having a lower surface 131. Arranged circumferentially in the lower exterior region of the ring is a plurality of flat or uniplanar areas or zones 134 machined or otherwise formed in the periphery of the ring. By reason of the circumferential curvature of the ring, each of the flattened or planar surface portions 134 is defined by a curved ledge 136 particularly shown in FIG. 21, each ledge 136 and planar surface 134 forming a notch or zone 138. The notches or zones 138 function in the manner of recesses in the lower peripheral portion of the ring to establish turbulence and cavitation to promote a down-pumping action of fluid or oil on the cylinder wall during certain reciprocatory movements of the ring 126.

It is found that the depth of the ledge 136 may be within a range of about 0.005 of an inch and 0.015 of an inch, the depth depending in a measure on the exterior diameter of the ring and the size desired for the zones 138 provided by the flat or planar surfaces 134. The zones 138 provide low pressure regions of the ring to establish cavitation and hence a down-pumping action of the ring during reciprocatory movements of the ring.

For purposes of illustration, greatly enlarged views of the forms of ring construction of the invention have been shown in the drawings. The compression rings in actual size are much smaller than herein illustrated and, while the compression ring constructions may vary in dimensions, the ring may be approximately ⅛ of an inch in vertical thickness and of a radial thickness of approximately 3/16 of an inch. The oil ring of the character shown in FIGS. 13 and 14 is of a width or thickness greater than that of a compression ring.

The ring construction of the invention may be fashioned of iron or other suitable metal or of a resinous material such as Teflon reinforced or filled with glass fibers.

It is apparent that, within the scope of the invention, modifications and different arrangements may be made other than as herein disclosed, and the present disclosure is illustrative merely, the invention comprehending all variations thereof.

I claim:

1. A piston ring construction adapted to be mounted in an annular groove in a piston of a reciprocating system comprising a parted annular body, said body having an exterior peripheral sealing surface adjacent the mid region of the body, and said body having an exterior substantially frusto-conically shaped area below the mid region extending downwardly and inwardly from the peripheral sealing surface defining a zone for promoting cavitation in said zone during reciprocatory movements of the piston, said frusto-conically shaped area having recesses therein for establishing turbulence in said zone.

2. A piston ring construction adapted to be mounted in an annular groove in a piston of a reciprocative system comprising a parted annular body, said body having an exterior peripheral sealing surface, and said body having an exterior substantially frusto-conically shaped contour adjacent the sealing surface extending downwardly and inwardly from the peripheral sealing surface defining a zone for promoting cavitation in said zone during reciprocatory movements of the piston, the frusto-conically shaped contour being configurated with peripheral recesses and projections for establishing turbulence during reciprocatory movements of the ring.

3. A piston ring construction adapted to be mounted in an annular groove in a piston of a reciprocating system comprising a parted annular body, said body having an exterior peripheral sealing portion, said body having circumferential surfaces of progressively decreasing diameters downwardly of the peripheral sealing portion of the ring, the peripheral regions of said circumferential surfaces defining a relief zone for promoting cavitation during reciprocatory movements of the piston.

4. A piston ring construction adapted to be mounted in an annular groove in a piston of a reciprocating system comprising a parted annular body, said body having an exterior peripheral sealing portion, said body having an exterior substantially frusto-conically shaped area adjacent the peripheral sealing portion of the body, said frusto-conically shaped area having a plurality of circumferential recesses of progressively decreasing peripheral dimensions downwardly of the piston ring, said recesses defining a zone adapted to establish cavitation during reciprocatory movements of the piston.

5. The piston ring construction according to claim 4 wherein each of the circumferential recesses is of curved configuration in cross section.

6. A reciprocating system having a piston reciprocable in a cylinder involving a lubricating fluid, the piston being equipped with a one-piece parted ring having a peripheral sealing surface, said ring having a frusto-conically shaped circumferential configuration adjacent the peripheral sealing surface extending downwardly and inwardly from the peripheral sealing surface defining with the cylinder an annular zone for promoting cavitation during reciprocatory movements of the piston to establish flow of lubricating fluid predominately in one direction of reciprocation of the piston, said frusto-conically shaped configuration having recesses therein for establishing turbulence in said annular zone.

7. A reciprocating system having a piston reciprocable in a cylinder involving a lubricating fluid, a one-piece parted compression ring mounted by the piston having a peripheral sealing surface, a generally frusto-conically shaped circumferential contour on a lower exterior portion of the ring, said frusto-conically shaped contour extending downwardly and inwardly from the peripheral sealing surface defining with the cylinder an annular zone for promoting cavitation during reciprocatory movements of the piston to influence flow of lubricant in one direction during reciprocation of the piston, said frusto-conically shaped contour having recesses therein for establishing turbulence in the annular zone.

* * * * *